(12) United States Patent
Vaccari

(10) Patent No.: US 12,139,962 B2
(45) Date of Patent: Nov. 12, 2024

(54) PROFILED ELEMENT FOR DOORS/WINDOWS MADE OF PLASTIC MATERIAL, IN PARTICULAR PVC

(71) Applicant: Graf Synergy S.r.l., Nonantola (IT)

(72) Inventor: Andrea Vaccari, Nonantola (IT)

(73) Assignee: Graf Synergy S.r.l., Nonantola (IT)

( * ) Notice: Subject to any disclaimer, the term of this patent is extended or adjusted under 35 U.S.C. 154(b) by 261 days.

(21) Appl. No.: 17/629,892

(22) PCT Filed: Jul. 30, 2020

(86) PCT No.: PCT/IB2020/057213
§ 371 (c)(1),
(2) Date: Jan. 25, 2022

(87) PCT Pub. No.: WO2021/024111
PCT Pub. Date: Feb. 11, 2021

(65) Prior Publication Data
US 2022/0275678 A1  Sep. 1, 2022

(30) Foreign Application Priority Data
Aug. 5, 2019  (IT) .......................... 102019000013968

(51) Int. Cl.
*E06B 3/58* (2006.01)
*B29C 65/00* (2006.01)
*B29C 65/20* (2006.01)
*E06B 3/30* (2006.01)
*E06B 3/96* (2006.01)

(52) U.S. Cl.
CPC ............ *E06B 3/5871* (2013.01); *B29C 65/20* (2013.01); *B29C 66/02241* (2013.01); *B29C 66/1162* (2013.01); *B29C 66/52431* (2013.01); *B29C 66/72523* (2013.01); *B29C 66/73921* (2013.01); *E06B 3/30* (2013.01); *E06B 3/9608* (2013.01)

(58) Field of Classification Search
CPC ........ E06B 3/5871; E06B 3/30; E06B 3/5409; B29C 66/1162; B29C 66/322; B29L 2031/006
See application file for complete search history.

(56) References Cited

U.S. PATENT DOCUMENTS

2003/0089054 A1   5/2003  Hornung

FOREIGN PATENT DOCUMENTS

EP        1028217        8/2000

OTHER PUBLICATIONS

International Search Report and the Written Opinion Dated Sep. 24, 2020 From the International Searching Authority Re. Application No. PCT/IB2020/057213. (9 Pages).

*Primary Examiner* — Patrick J Maestri

(57) ABSTRACT

The profiled element (1) comprises:
one main portion (2) defining a holding surface (2*a*) for a central panel (3) of a door/window (4), the main portion (2) being adapted to form a perimeter frame (5) of the door/window (4);
one retaining portion (6) which defines an abutment surface (6*a*) of the central panel (3) and is adapted to fasten the central panel (3) to the perimeter frame (5); and
non-removable connection means (7) which connect the main portion (2) to the retaining portion (6) and are adapted to allow the movement of the retaining portion (6) between a raised configuration, wherein it frees superiorly the holding surface (2*a*), and a retaining configuration, wherein it faces the holding surface (2*a*).

12 Claims, 7 Drawing Sheets

PROFILED ELEMENT FOR DOORS/WINDOWS MADE OF PLASTIC MATERIAL, IN PARTICULAR PVC

RELATED APPLICATIONS

This application is a National Phase of PCT Patent Application No. PCT/IB2020/057213 having International filing date of Jul. 30, 2020, which claims the benefit of priority of Italian Patent Application No. 102019000013968 filed on Aug. 5, 2019. The contents of the above applications are all incorporated by reference as if fully set forth herein in their entirety.

FIELD AND BACKGROUND OF THE INVENTION

The present invention relates to a profiled element for doors/windows made of plastic material, in particular PVC.

BACKGROUND ART

It is well known that, in many sectors of industrial activities, there is a particular need for renewing the manufactured products and looking for new ones in order to distinguish the same from those of the competitors.

This need is felt, in particular, in the industry involved in the manufacture of windows and doors made of plastic material, in particular PVC.

These windows and doors consist of a series of plastic profiled elements, usually formed by extrusion or similar techniques, which are welded together in order to create a perimeter frame, within which a central panel made of glass or other material can be placed.

In particular, each profiled element has a substantially L-shaped cross-section and defines a holding surface for the central panel.

The latter is then manually fitted by an operator into the previously welded perimeter frame, resting on the holding surfaces of the profiled elements.

Then, the same operator locks the central panel with retaining elements, commonly called "glazing beads", which are coupled to the profiled elements of the perimeter frame and pressed against the central panel to secure it to the frame itself.

As with the profiled elements, the glazing beads are also made of plastic material and can be obtained by extrusion or similar techniques.

During the application of the glazing beads, the operator also positions a sealing element, or seal, between the central panel and the retaining elements, as well as between the central panel and the holding surfaces of the profiled elements. Usually, the seals are joined to the glazing beads and to the profiled elements before the central panel is fitted into the perimeter frame; this way, the application of the glazing beads to the profiled elements causes at the same time the correct positioning of the seals with respect to the central panel.

At the end of the application of the central panel to the perimeter frame, commonly known as "glazing", the retaining profiled elements are an integral part of the window/door and the seals are juxtaposed under pressure onto the internal panel to ensure the tightness thereof.

However, the application of the retaining elements has some drawbacks.

First of all, the retaining elements must be cut to size, in an extremely precise manner, since, after being attached to the perimeter frame they are difficult to remove.

This operation, therefore, is particularly complex and, if not carried out correctly, it risks affecting the aesthetic effect of the window/door.

Therefore, the glazing operation must be carried out manually by specialized personnel and also involves lengthening the manufacturing time of the window/door.

It follows that this operation involves very high costs, which inevitably means an increase in the selling price of the windows and doors, with the risk of making the products less attractive to customers.

DESCRIPTION OF THE INVENTION

The main aim of the present invention is to devise a profiled element for doors/windows made of plastic material, in particular PVC, which allows considerably simplifying the glazing operation.

Within this technical aim, one object of the present invention is to create a profiled element for doors/windows made of plastic material, in particular PVC, which allows significantly reducing the costs related to this operation.

A further object of the present invention is to devise a profiled element for doors/windows made of plastic material, in particular PVC, which allows manufacturing a window/door with valuable aesthetic effects, in a practical, easy and functional way.

Another object of the present invention is to devise a profiled element for doors/windows made of plastic material, in particular PVC, that allows overcoming the aforementioned drawbacks of the prior art within a simple, rational, easy, effective to use and low cost solution.

The aforementioned objects are achieved by the present profiled element for doors/windows made of plastic material, in particular PVC, having the characteristics of claim 1.

BRIEF DESCRIPTION OF THE SEVERAL VIEWS OF THE DRAWINGS

Other characteristics and advantages of the present invention will be more evident from the description of a preferred, but not exclusive, embodiment of a profiled element for doors/windows made of plastic material, in particular PVC, illustrated by way of an indicative, but non-limiting example, in the attached tables of drawings in which.

DESCRIPTION OF SPECIFIC EMBODIMENTS OF THE INVENTION

Figure 1:
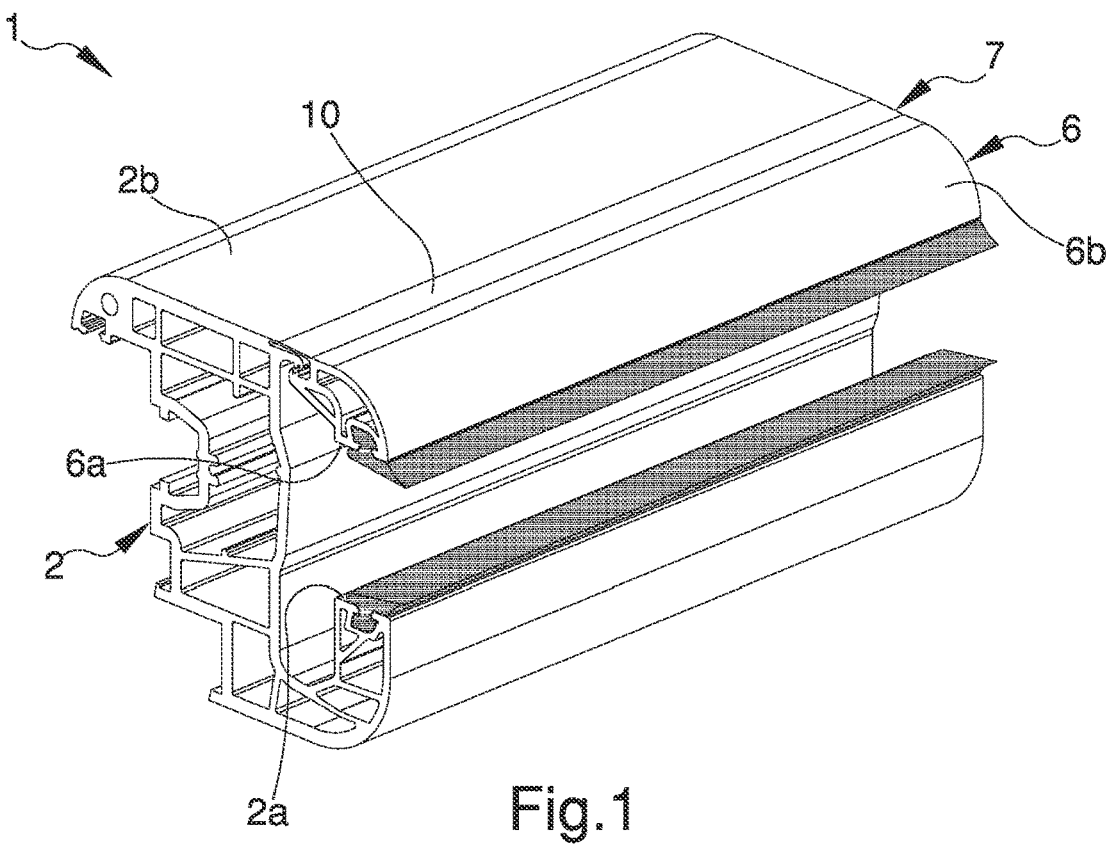
FIG. 1 is an axonometric view of the profiled element for doors/windows made of plastic material, in particular PVC, according to the invention, in a first embodiment.
Figure 2:
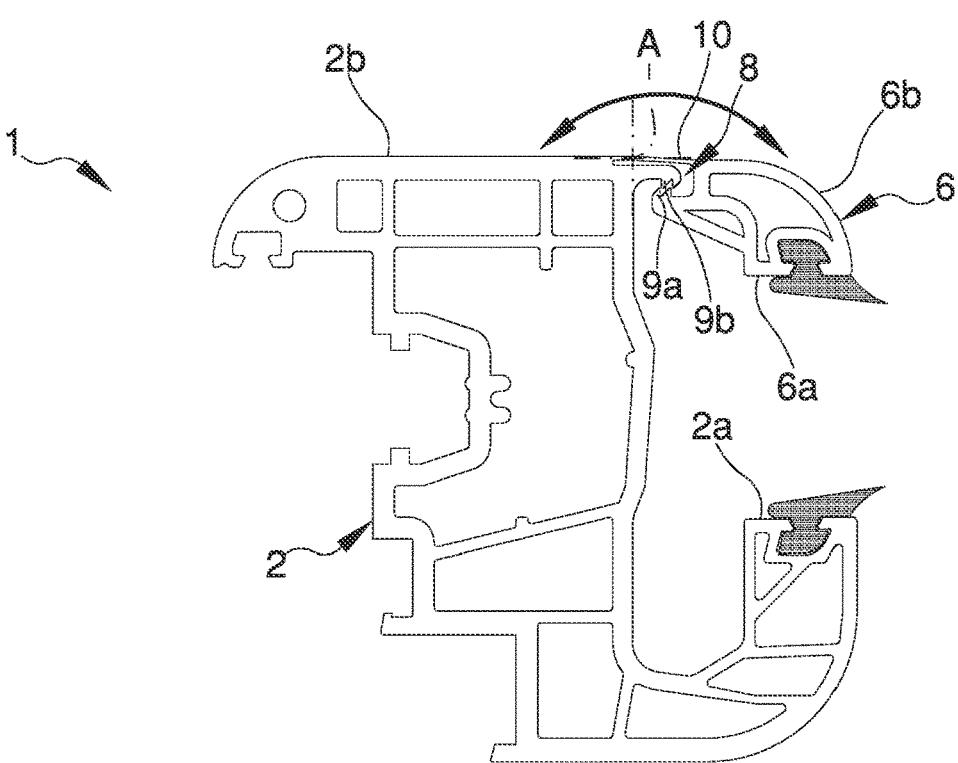
FIGS. 2, 3 and 4 are side sectional views of the profiled element for doors/windows made of plastic material, in particular PVC, according to the first embodiment.
Figure 3:
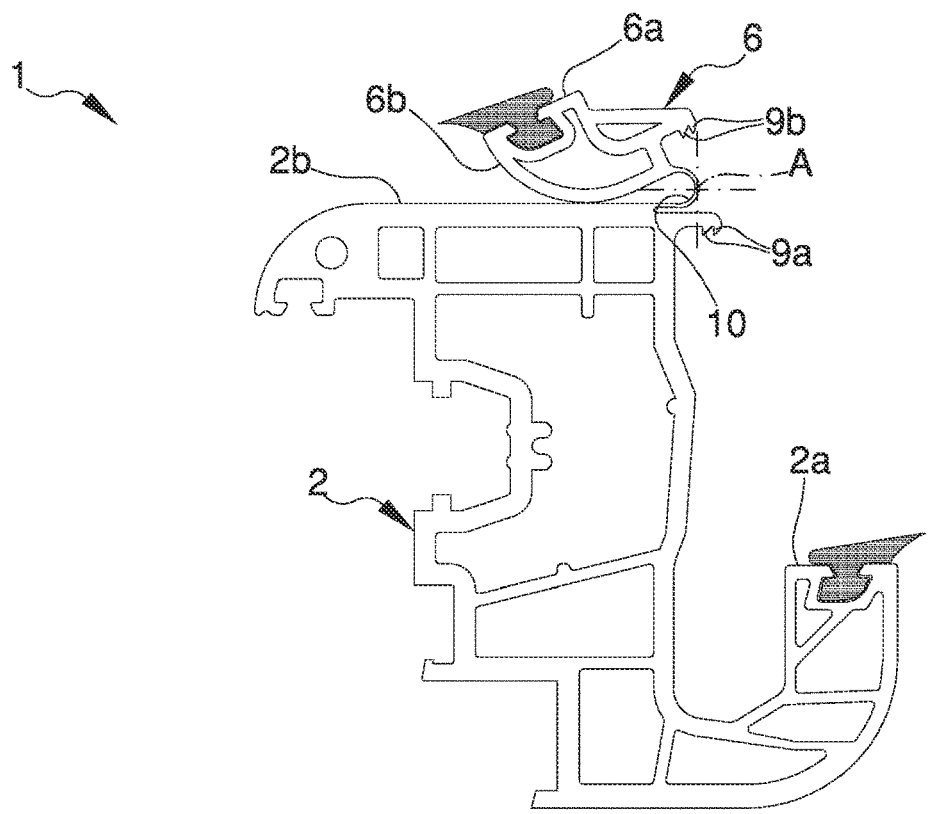

With particular reference to these figures, reference numeral 1 globally indicates a profiled element for doors/ windows made of plastic material, in particular PVC. The profiled element 1 according to the invention comprises at least one main portion 2 made of plastic material extending along a longitudinal direction and defining a holding surface 2a for a central panel 3 of a door/window 4, wherein the main portion 2 is adapted to form a perimeter frame 5 of the aforementioned door/window 4.

The main portion 2 defines the external perimeter of the aforementioned door/window 4 and has a substantially L-shaped cross-section.

This particular conformation defines the holding surface 2a, which intercepts the central panel 3 at the perimeter edges of the same.

The main portion 2 is preferably made of PVC, but it cannot be ruled out that it can also be made of heat-sealable plastic materials other than PVC.

The main portion 2 can be obtained, e.g., by extruding the plastic material through an extrusion mask, so that the longitudinal direction of the main portion 2 coincides with the exit direction of the plastic material from the extrusion mask.

In addition, the profiled element 1 comprises at least one retaining portion 6 which extends parallel to the longitudinal direction, defines an abutment surface 6a of the central panel 3 and is adapted to fasten the central panel 3 to the perimeter frame 5.

The retaining portion 6 has the function of keeping the central panel 3 fastened to the perimeter frame 5.

For this purpose, the retaining portion 6 is brought closer to the central panel 3 so that the abutment surface 6a intercepts the central panel 3 at the aforementioned perimeter edges.

Substantially, the main portion 2 and the retaining portion 6 define a sandwich-like coupling with the central panel 3.

In this configuration, the abutment surface 6a faces the holding surface 2a, on the opposite side of the central panel 3.

The retaining portion 6 can also be made of plastic material.

The retaining portion 6, in turn, can be obtained by extrusion of the aforementioned plastic material through an extrusion mask.

The plastic material is preferably PVC, but it cannot be ruled out that the retaining portion 6 may also be made of heat-sealable plastic materials other than PVC. Alternatively, the retaining portion 6 can be made of aluminum, wood, or another suitable material.

Advantageously, the profiled element 1 comprises non-removable connection means 7 which connect the main portion 2 to the retaining portion 6 and extend along at least one longitudinal axis A parallel to the longitudinal direction.

For the purpose of the present treatise, the expression "non-removable" means that the connection means 7 are associated with the main portion 2 and with the retaining portion 6 and allow them to remain connected to each other in any configuration of use.

The connection means 7 are adapted to allow the movement of the retaining portion 6 with respect to the main portion 2 between a raised configuration, wherein the retaining portion 6 frees superiorly the holding surface 2a for the positioning of the central panel 3, and a retaining configuration, wherein the retaining portion 6 faces the holding surface 2a.

The connection means 7, therefore, connect the retaining portion 6 to the main portion 2 and allow the movement of the one with respect to the other.

In particular, in the retaining configuration, the holding surface 2a and the abutment surface 6a are moved close together and are arranged substantially parallel to each other, while in the raised configuration, the retaining portion 6 is moved away so that the central panel 3 may be applied to the perimeter frame 5. Conveniently, the connection means 7 comprise rotational means for the rotation of the retaining portion 6 around the at least one longitudinal axis A between the raised configuration and the retaining configuration.

The retaining portion 6 is, therefore, movable in rotation with respect to the main portion 2 to move away from the holding surface 2a.

The main portion 2 is provided with at least one main face 2b and the retaining portion 6 is provided with at least one secondary face 6b, wherein, in the raised configuration, the faces 2b and 6b are close to each other.

For the purpose of the present discussion, the expression "main faces" means the surfaces of the main portion 2 which are intended to remain visible after the door/window 4 has been assembled.

By "secondary faces", on the other hand, we mean surfaces of the retaining portion 6 that are intended to remain visible after the door/window 4 has been assembled and which intercept the central panel 3 of the door/window itself.

In actual facts, when the door/window 4 is mounted on a wall or partition, the main faces 2b and the secondary faces 6b are the surfaces of the profiled element 1 facing the inside or outside of the wall or partition.

The rotation of the retaining portion 6 with respect to the at least one longitudinal axis A causes the secondary face 6b to overlap at least partly with the respective main face 2b.

Conveniently, the profiled element 1 comprises locking means 8 of the retaining portion 6 in the retaining configuration which are positionable between a disengagement position, wherein they allow the movement of the retaining portion 6 between the retaining configuration and the raised configuration, and at least one engagement position, wherein the locking means 8 operate in conjunction with the central panel 3 to maintain the retaining portion 6 in the retaining configuration.

In more detail, when the retaining portion 6 is moved towards the retaining configuration and intercepts the central panel 3, the latter forces the retaining portion 6 to follow a trajectory that causes the locking means 8 to arrange themselves in the engagement position, thus preventing the retaining portion itself from moving.

As a result, when the locking means 8 are in the engagement position, it is no longer possible to move the retaining portion 6 from the retaining configuration to the raised configuration.

In this position, the abutment surface 6a is substantially parallel to the holding surface 2a.

On the contrary, in the absence of the central panel 3, the retaining portion 6 has freedom of movement and the locking means 8 are in the disengagement position.

The locking means 8 comprise at least a first notch 9a defined on the main portion 2 and at least a second notch 9b defined on the retaining portion 6 adapted to define a ratchet coupling.

In particular, in the engagement position, the notches 9a and 9b are in contact with each other, while in the disengagement position, the notches 9a and 9b are moved away from each other.

The ratchet coupling mechanism is known to the technician in the field and, specifically, indicates a type of coupling wherein the notches 9a and 9b are movable one with respect to the other and, after being arranged in the engagement position, they are unable to return to the disengagement position.

Conveniently, the locking means 8 comprises a plurality of first notches 9a and a plurality of second notches 9b.

In the engagement position, each second notch 9b is engaged with a respective first notch 9a.

FIGS. 1 to 6 show a first embodiment of the present profiled element 1 wherein the main portion 2, the retaining portion 6 and the connection means 7 are made of a single body piece of plastic material.

In particular, the profiled element 1 is obtained by extruding the plastic material through an extrusion mask which is shaped so as to extrude the main portion 2, the retaining portion 6 and the connection means in a single body piece.

The connection means 7 comprise a connecting strap 10 foldable between the retaining configuration and the raised configuration.

The connecting strap 10 is positioned between the main portion and the retaining portion 6 and extend over the entire length of the portions 2 and 6, parallel to the longitudinal direction.

The connecting strap 10 is foldable at several points, therefore, it does not define a single longitudinal axis A, but a plurality of longitudinal axes A around each of which the retaining portion 6 may rotate to position itself between the retaining configuration and the raised configuration.

The connecting strap 10, in actual facts, gives multiple degrees of freedom to the retaining portion 6 which, in the absence of the central panel 3, can be moved freely between the two configurations.

Figure 4:
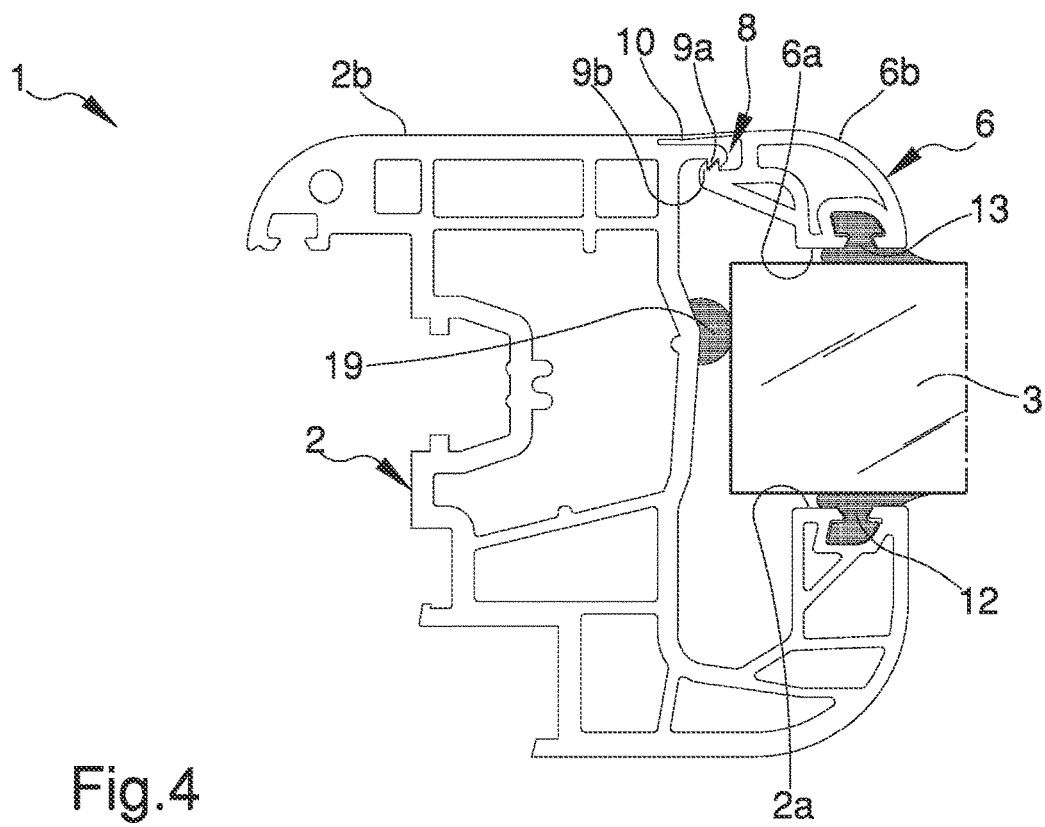

In this situation, in fact, the notches 9a and 9b may be juxtaposed but are never in the engagement position, thus allowing free rotation of the retaining portion 6. Conversely, in the presence of the central panel 3, the notches 9a and 9b are kept in mutual contact in the engagement position and the retaining portion 6 is kept in the retaining configuration (FIG. 4).

Conveniently, the profiled element 1 comprises at least a first seal element 12 associated with the main portion 2 at the holding surface 2a.

The profiled element 1 also comprises at least a second seal element 13 associated with the retaining portion 6 at the abutment surface 6a.

The seal elements 12, 13 are adapted to be positioned between the central panel 3 and the respective portions 2, 6.

Advantageously, the seal elements 12, 13 are at least partly made of an elastically deformable material.

This ensures that the portions 2, 6 adhere perfectly to the central panel 3, thus avoiding any air and/or water infiltration into the door/window 4.

In addition, the elastically deformable material facilitates the glazing operation, thus allowing the seal elements 12, 13 to be partly compressed on the central panel 3 to facilitate the positioning of the retaining portion 6 in the retaining configuration and of the notches 9a and 9b in the engagement position.

The elastically deformable material is selected from the list comprising rubber, silicone, or another material suitable for this purpose.

The seal elements 12, 13 can be obtained, in turn, by extrusion through their respective extrusion masks.

In addition, the first seal element 12 can be co-extruded together with the main portion 2.

Likewise, the second seal element 13 can be co-extruded together with the retaining portion 6.

In this case, the relevant extrusion masks are suitably shaped so as to extrude the seal elements 12, 13 together with the respective portions 2, 6.

The profiled element 1 also comprises at least one shock-absorbing component 19 associated with the main portion 2 and adapted to receive the central panel 3 in support.

It should be noticed that the shock-absorbing component 19 is shown for the sake of simplicity only in FIG. 4, however, it is to be understood as present in all figures and in all embodiments of the present invention.

The shock-absorbing component 19 has a substantially half-moon shaped cross-section, it is longitudinally associated with the main portion 2 and it extends substantially over the entire length of the latter.

The shock-absorbing component 19 has the function of stabilizing the central panel 3 inside the perimeter frame 5 and of making it more resistant to the stresses encountered during the use of the door/window 4.

Advantageously, the shock-absorbing component 19 is made of an elastically deformable material of the type of rubber, silicone, or another material suitable for this purpose.

In addition, the shock-absorbing component 19 can be co-extruded together with the main portion 2.

Also in this case, the extrusion mask is suitably shaped so as to extrude the shock-absorbing component 19 together with the main portion 2.

The profiled element 1 is intended to be used in the manufacture of a door/window 4 made of plastic material.

The door/window 4 can be made by joining three or more profiled elements, suitably cut to define the perimeter frame 5.

Preferably, the door/window 4 has a substantially rectangular shape and, in the same way, the central panel 3 is rectangular; alternative embodiments cannot however be ruled out, wherein the door/window 4 and the central panel 3 are differently shaped (e.g. triangle, pentagon, hexagon, and the like).

Figure 5:
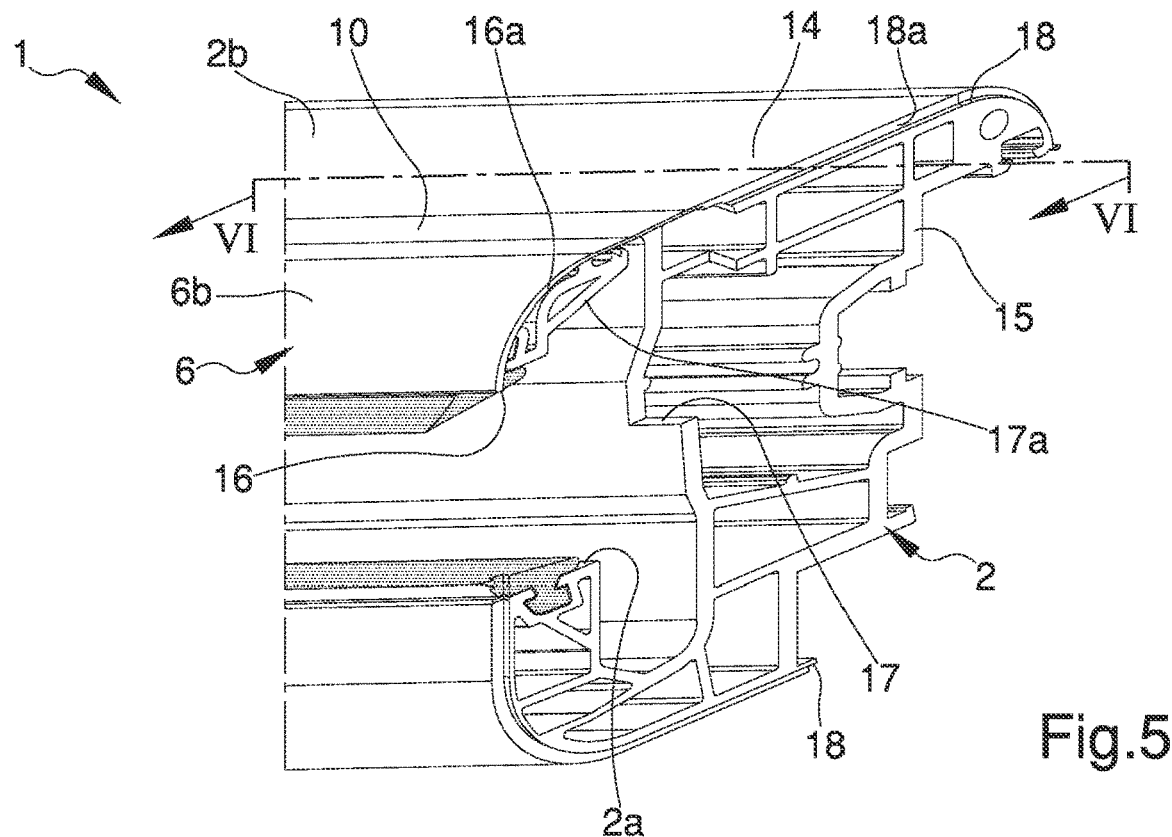
FIG. 5 is an axonometric view of a second embodiment of the present invention.

FIG. 5 shows a second embodiment of the present invention wherein the profiled element 1 is cut transversely with respect to the longitudinal direction.

In more detail, the profiled element 1 is cut at an angle with respect to the longitudinal direction.

Conveniently, after cutting, the profiled element 1 comprises at least one end 14 substantially inclined by an angle comprised between 10° and 80° with respect to the longitudinal direction.

The ends 14 of the profiled element 1 are preferably cut at 45° so that, when joined to another profiled element 1, they form a 90° angle with each other. The main portion 2 comprises at least one area to be welded 15 defined at the end 14 and adapted to be welded to at least one area to be welded 15 of another adjacent profiled element 1 to form a perimeter frame 5.

Within the present treatise, by "area to be welded" is meant a transverse surface of the profiled element obtained by cutting the profiled element itself along an oblique direction.

The transverse surface of the profiled element 1 can be properly leveled to eliminate any imperfections caused by the cutting operation.

Conveniently, the profiled element 1 comprises at least a first recess 16 defined at the secondary face 6b to form a first surface 16a substantially parallel to the area to be welded 15.

The first surface 16a is placed at a first distance D1 from the area to be welded 15.

In addition, the profiled element 1 comprises a second recess 17 defined at an internal matrix of the retaining portion 6 to form a second surface 17a substantially parallel to the area to be welded 15.

Figure 6:
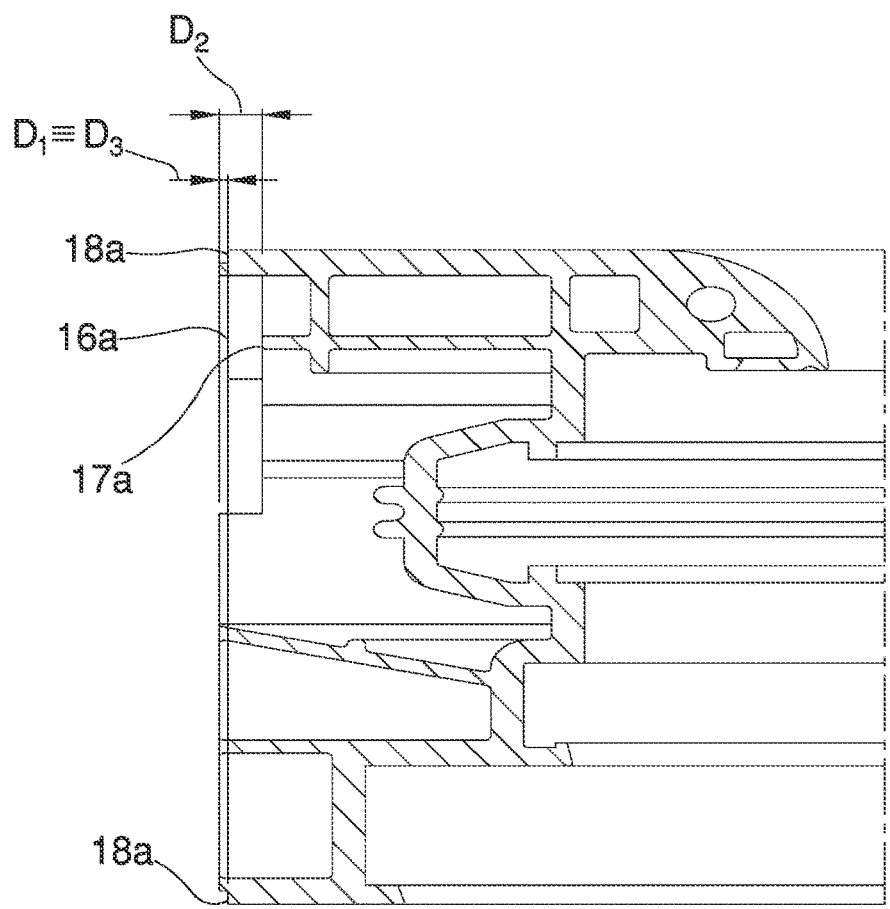
FIG. 6 is a sectional view along the plane VI-VI of FIG. 5.

The second surface 17a is placed at a second distance D2 from the area to be welded 15, wherein the second distance D2 is greater than the first distance D1 (FIG. 6).

Substantially, at the end 14, the secondary face 6b protrudes from the respective internal matrix.

The first recess 16 and the second recess 17 have the function of reducing the length of the retaining portion 6 with respect to the main portion 2, so that the retaining portion 6 keeps freedom of movement as a result of the joining of the profiled elements 1.

In particular, the first recess 16 has the function of spacing the secondary faces 6b of adjacent profiled elements 1 during the joining of the same.

It is necessary, in fact, that the welding only affects the main portions 2 of the profiled elements 1 in order to allow the subsequent movement of the retaining portions 6.

The first recess 16 is made in such a way that, once the profiled elements 1 are joined, the secondary faces 6b are juxtaposed to each other without cracks between one secondary face 6b and the other, in order to avoid undesirable aesthetic defects.

The second recess 17, on the other hand, is adapted to allow the movement of the retaining portion 6 between the raised configuration and the retaining configuration with respect to the retaining portion 6 of the adjacent profiled element 1.

When the profiled elements 1 are joined together, the second recess 17 allows the internal matrices of the adjacent retaining portions 6 to be spaced away from each other so that a retaining portion 6 does not obstruct the movement of the adjacent retaining portion 6 and vice versa.

The profiled element 1 also comprises a groove 18 made at the main faces 2b. The groove 18, in particular, affects the peripheral edge of the main faces 2b and defines a third surface 18a substantially parallel to the area to be welded 15. The third surface 18a is arranged at a third distance D3 from the area to be welded 15.

Preferably, the third distance D3 coincides with the first distance D1 (FIG. 6), or is slightly less than the first distance D1.

The function of the groove 18 is to partly reduce the length of the corresponding main face 2b so that, after welding the profiled elements, the welding bead extends inwards of the profiled elements 1 and is therefore not visible on the visible surface of the door/window.

For the purposes of the present treatise, by "welding bead" is meant the portion of excess molten plastic material that is compressed during the joining of the profiled elements and may protrude from the visible surfaces of the profiled elements themselves.

This way, after the main portions 2 have been welded, the faces 2b, 6b of a profiled element 1 are perfectly juxtaposed to the corresponding faces 2b, 6b of the adjacent profiled element 1.

The profiled element 1 is usable in a process for the manufacture of a door/window 4 made of plastic material, which the present invention also relates to and is shown, at least partly, in FIGS. 7 to 11.

According to a first embodiment of the present process, the preliminary phase is provided of extruding the plastic material through at least one extrusion mask.

The extrusion mask is shaped so as to extrude the main portion 2, the retaining portion 6 and the connection means 7 into a single body piece.

The extrusion can usefully comprise the phase of co-extruding the seal elements 12, 13 together with the respective portions 2, 6.

Alternatively, the process comprises the step of applying the seal elements 12, 13 to the respective portions 2, 6.

In addition, the extrusion may comprise the phase of co-extruding the shock-absorbing component 19 together with the main portion 2.

Alternatively, the process may also comprise the phase of applying the shock-absorbing component 19 to the main portion 2, e.g. by bonding.

The process therefore comprises the phase of providing a plurality of profiled elements 1, each provided with at least one end 14 substantially inclined by an angle of between 10° and 80° with respect to the longitudinal direction and wherein each of the main portions 2 comprises at least one area to be welded 15 defined at the end 14.

In other words, the extruded profiled elements 1 must be cut along a cutting plane inclined by an angle of between 10° and 80° to form the end 14.

At this point, the transverse surface of the end 14 can be properly leveled to remove any imperfections caused by cutting.

Figure 7:
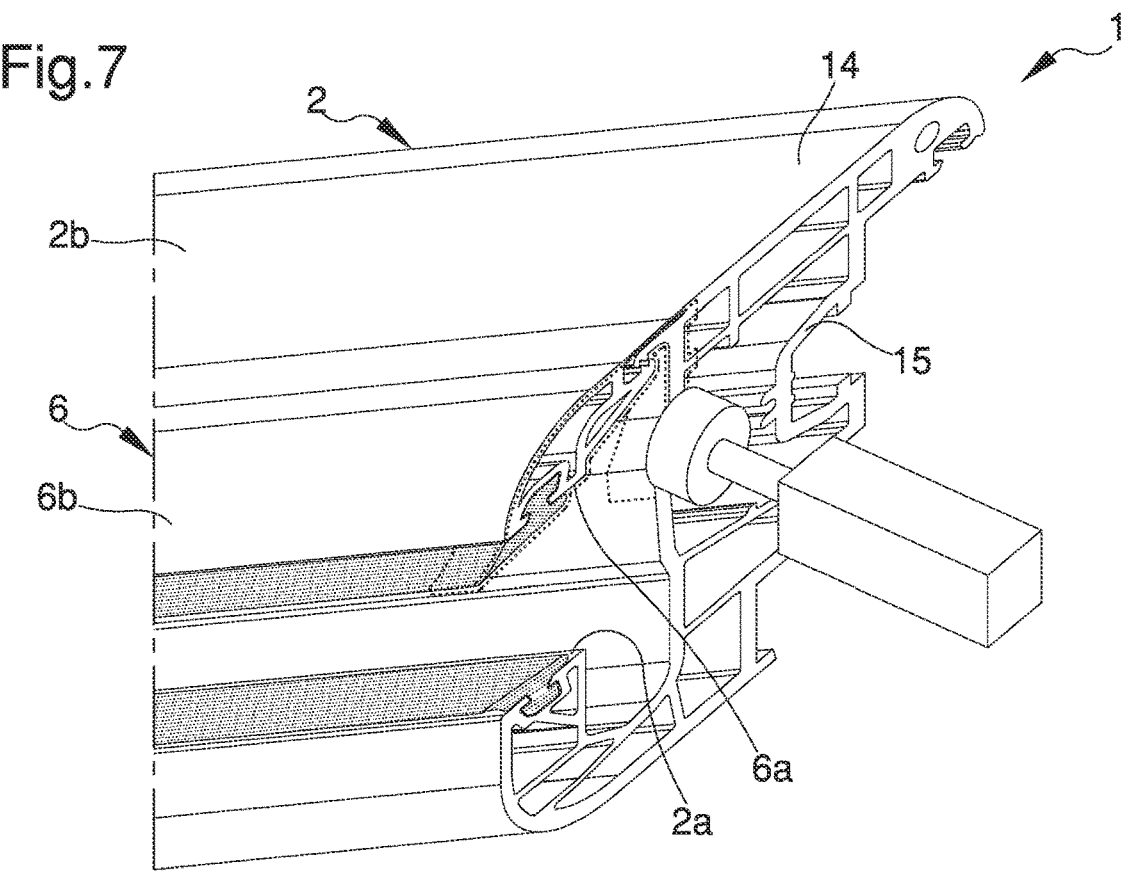
FIGS. 7, 8, 9, 10 and 11 show some of the phases of a process for the manufacture of windows and doors made of plastic material according to the invention.

This operation can be done by removing the plastic material, e.g., by milling Advantageously, the process comprises the phase of making the second recess 17 at the internal matrix of the retaining portion 6 through an operation of removal of material (FIG. 7).

The removal of material can be carried out, e.g., by milling.

Figure 8:
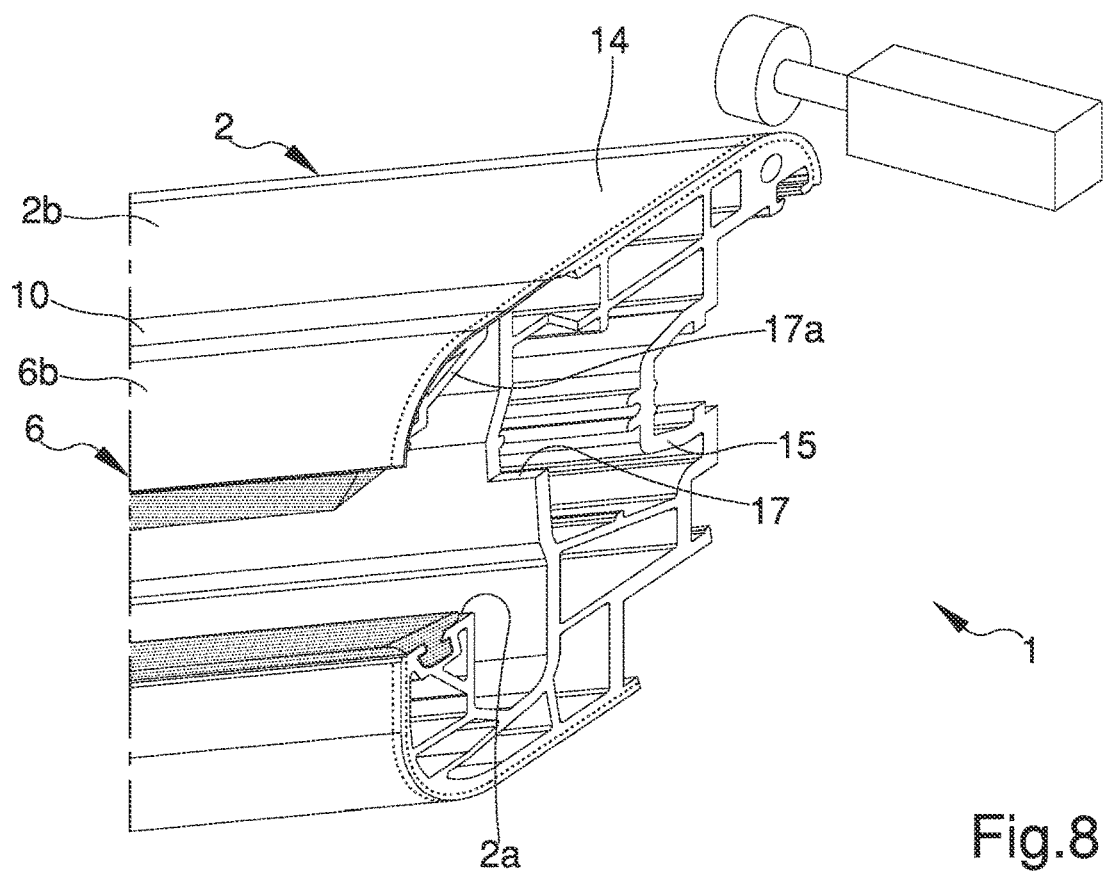

The process comprises the phase of making the first recess 16 at the secondary face 6b through an operation of removal of material (FIG. 8).

As with the above, the removal of material can also take place by milling.

In particular, material removal operations are carried out so that the second distance D2 is greater than the first distance D1.

In other words, the milling is carried out deeper to make the second recess 17 than to make the first recess 16.

The process may also comprise the phase of making the groove 18 at the main faces 2b of the main portion 2 (FIG. 8).

The groove 18 can be achieved by material removal, such as e.g., milling.

The material removal operations described above can be carried out very advantageously on a single machine as, e.g., shown in patent application WO2013132406.

Specifically, this document describes a welding machine provided with a group of cutters that can be positioned between the cut ends of the profiled elements, capable of performing operations such as leveling and grooving and which can also be used to make the recesses 16, 17, simultaneously on both ends 14 of the profiled elements 1 to be joined.

These removal operations contribute to the finishing of the area to be welded 15 of the main portion 2, in order to ensure a precise and optimal joining of the profiled elements 1.

Figure 9:
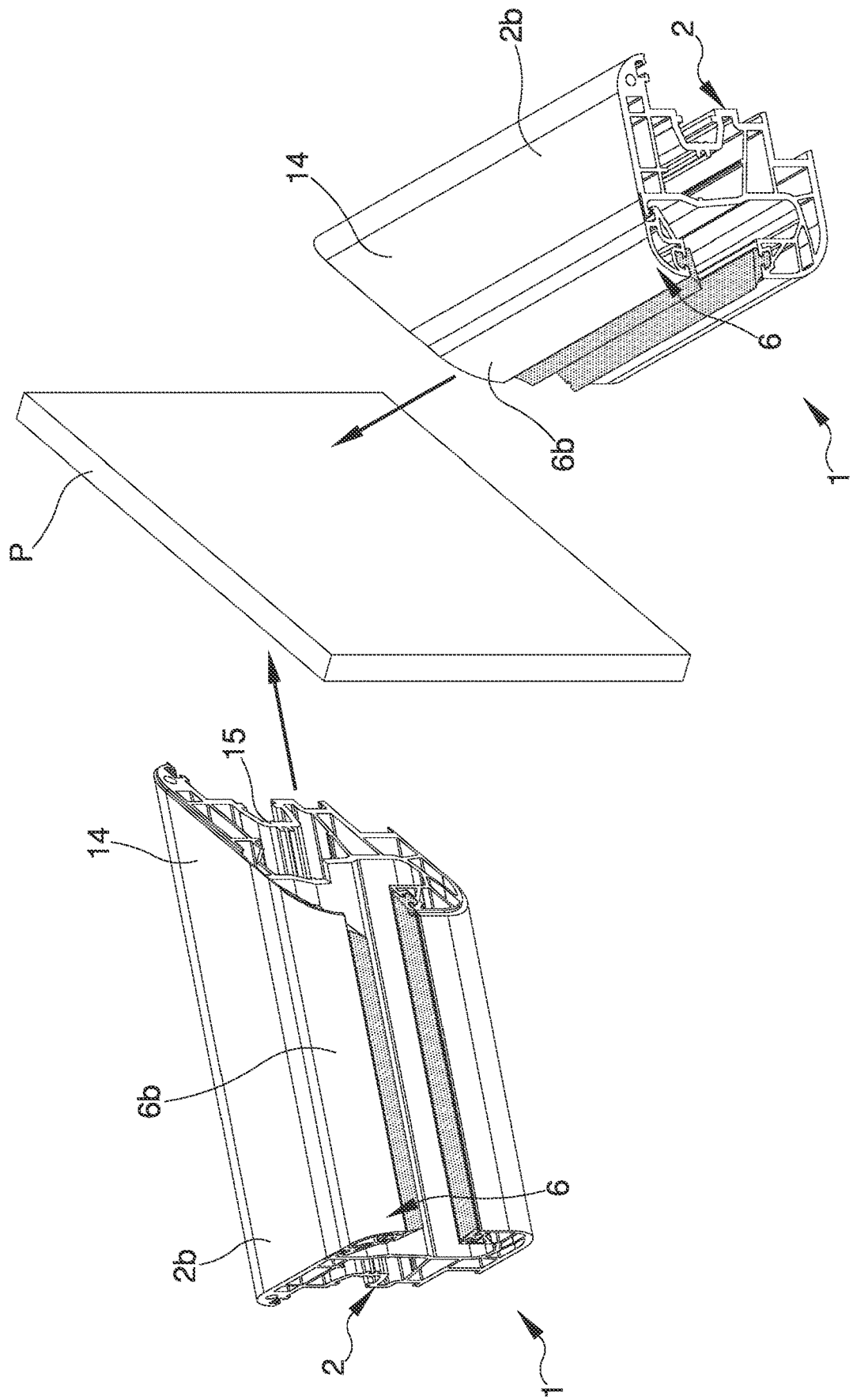
Figure 10:
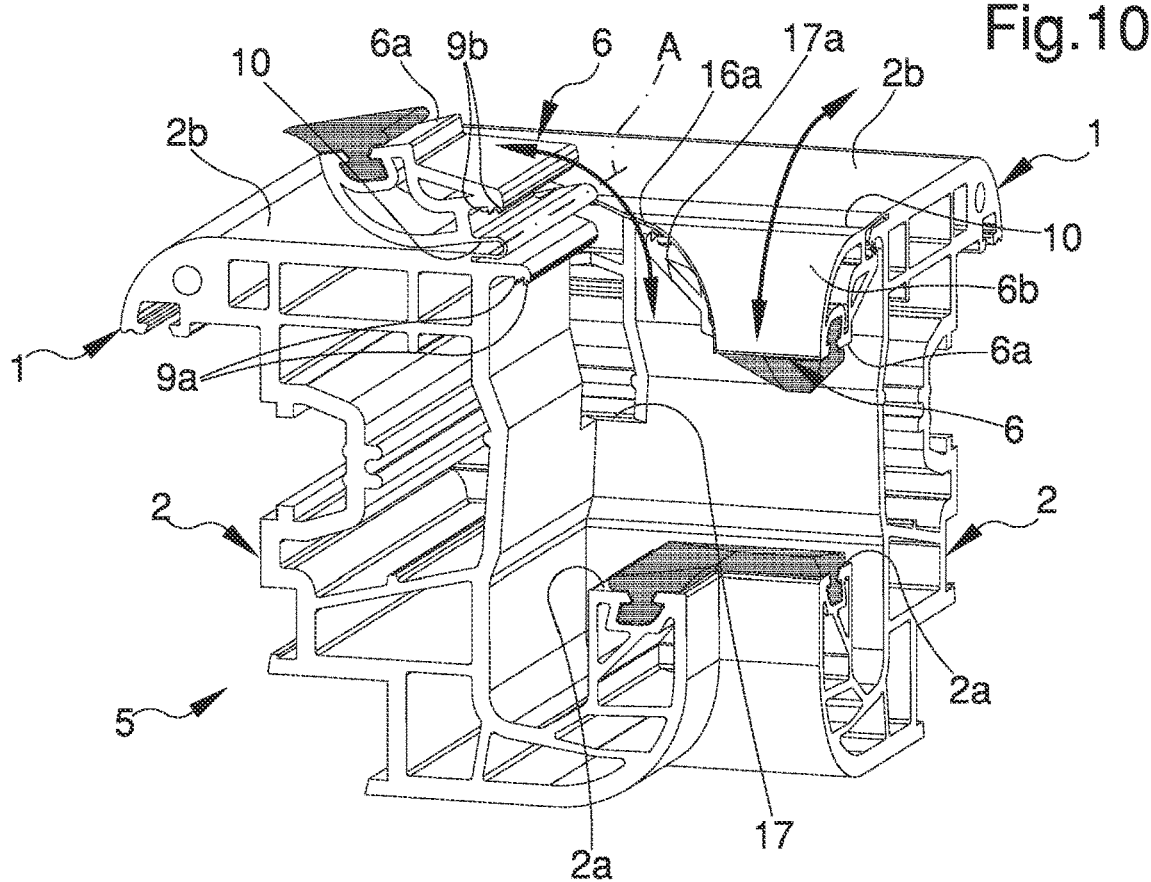

As shown in FIG. 9, the profiled elements 1 are arranged with the areas to be welded 15 facing each other.

The areas to be welded 15 are heated up to melting, at least partial, of the plastic material.

The phase of heating is carried out by means of a welding plate P, e.g. an electric resistance plate, which is placed in contact with the areas to be welded 15 to at least partly melt the plastic material of the main portion 2.

The welding plate P is then removed and the main portions 2 are welded together by joining the ends 14 and pressing the profiled elements 1 against each other to keep the areas to be welded 15 in mutual contact to form the perimeter frame 5.

At this point, the main portions 2 are firmly joined together, while the retaining portions 6 are juxtaposed through the secondary faces 6*b*.

The presence of the second recess 17 gives high freedom of movement to the retaining portions 6, which can rotate around the at least one longitudinal axis A, thus avoiding mutual interactions.

The retaining portions 6 are then moved to the raised configuration to free the holding surfaces 2*a* (FIG. 10) superiorly.

In more detail, the retaining portions 6 are rotated so that the secondary faces 6*b* are juxtaposed to the respective main faces 2*b*.

The process then comprises the phase of providing a central panel 3 and placing it on the holding surfaces 2*a*.

The central panel 3 is placed resting inside the perimeter frame 5 so that the perimeter edges of the central panel itself are in contact with the holding surfaces 2*a*.

In more detail, the central panel 3 is arranged resting on the first seal elements 12 associated with the holding surface 2*a*.

The retaining portions 6 are displaced towards the retaining configuration; in doing so, the abutment surfaces 6*a* move close to the central panel 3.

Figure 11:
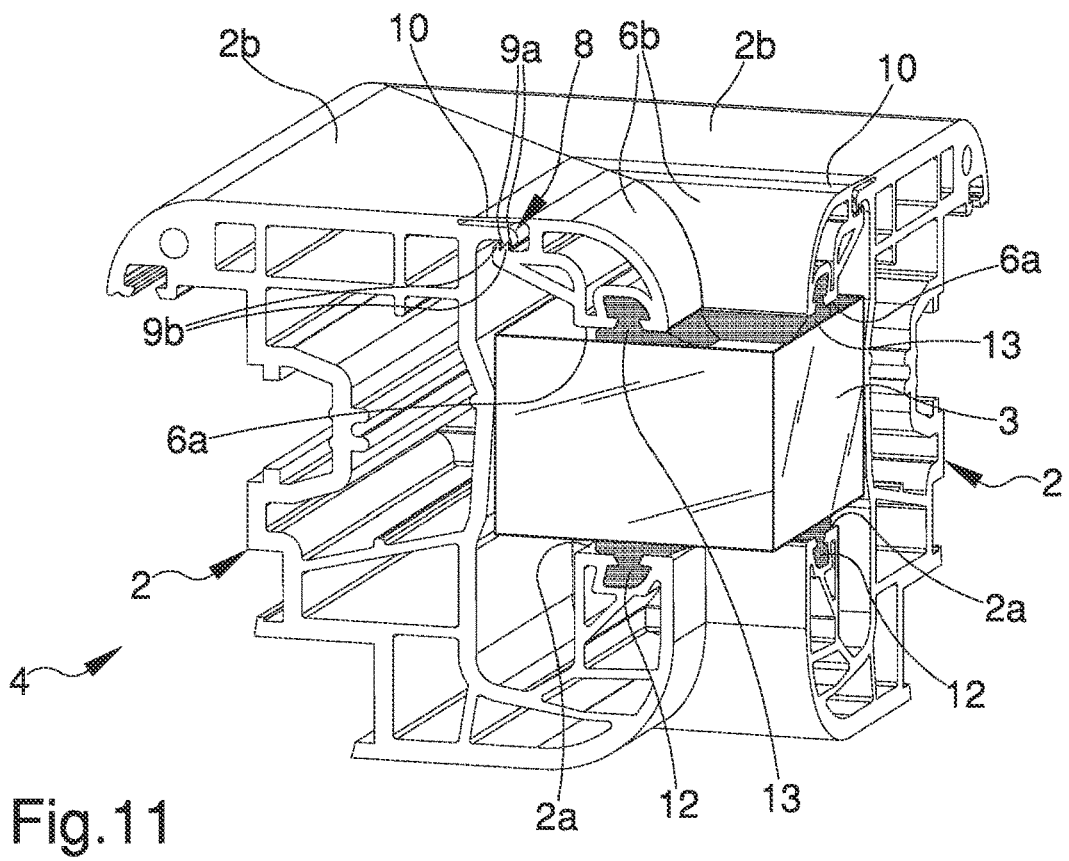

The retaining portions 6 are then pressed against the central panel 3 to bring the locking means 8 to the engagement position (FIG. 11).

During this phase, the second notches 9*b* slide with respect to the first notches 9*a* until each second notch 9*b* is engaged with a respective first notch 9*a*.

At this point, the abutment surface 6*a* is arranged substantially parallel to the holding surface 2*a* and intercepts the central panel 3.

In more detail, the abutment surface 6*a* is juxtaposed to the central panel 3 through the second seal elements 13 associated therewith.

In this configuration, the retaining portions 6 are no longer able to be moved towards the raised configuration and the central panel 3 is thus firmly associated with the perimeter frame 5 to obtain the door/window 4.

The process according to the invention comprises a set of phases which, for the sake of simplicity, have been described so far according to a pre-established time sequence.

It is easy to understand, however, that some of these phases may be carried out in a different order than described.

For example, all the operations of leveling and making the groove 18 and the recesses 16, 17 can take place before or after the phase of arranging the areas to be welded 15 facing each other.

The phase of moving the retaining portions 6 towards the raised configuration can also take place before heating the areas to be welded 15.

This way, during the heating phase, at the ends 14 of the profiled elements 1, the retaining portions 6 are further spaced apart from each other and the risk that the retaining portions themselves may be partially melted and, as a result, remain joined together during the next welding phase is considerably reduced.

Figure 12:
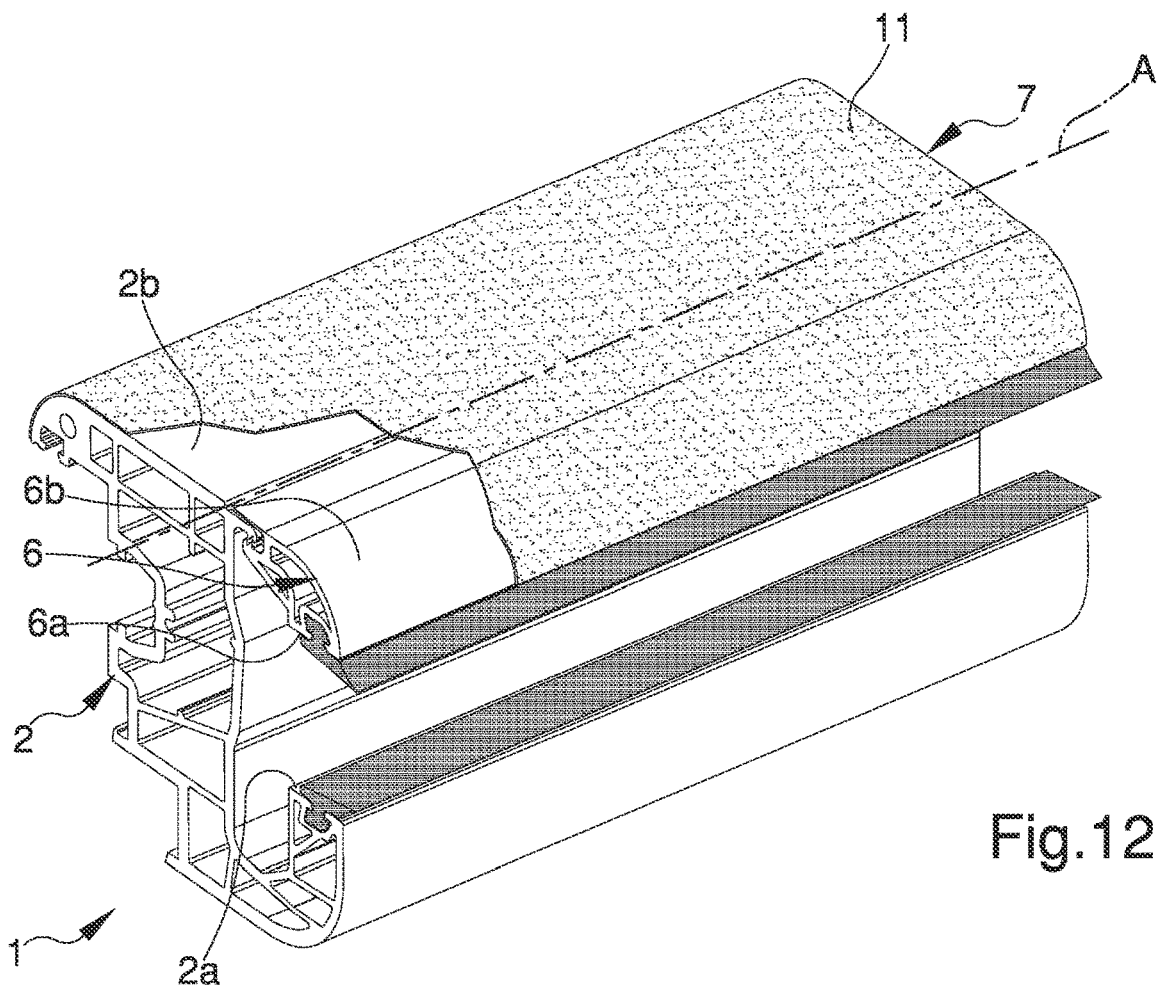
FIG. 12 is an axonometric view of the invention according to a third embodiment.
Figure 13:
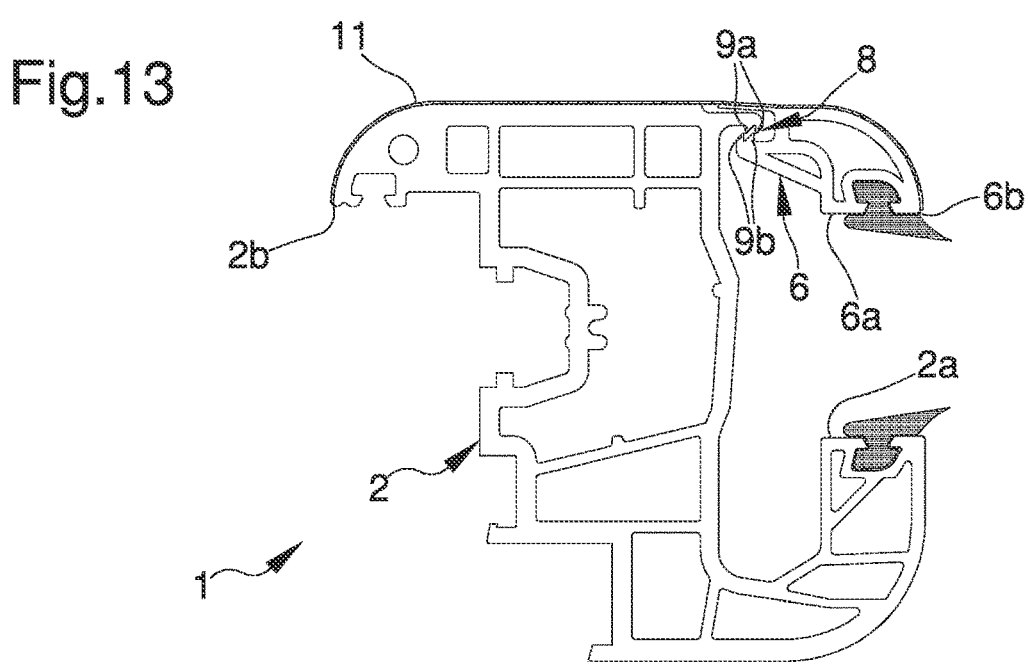
FIG. 13 is a side sectional view of the invention according to the third embodiment.

FIGS. 12 and 13, on the other hand, show a third embodiment of the profiled element 1 wherein the main portion 2 and the retaining portion 6 are made in separate body pieces and are kept together by the connection means 7 as a result of an assembly operation.

In particular, the main portion 2 and the retaining portion 6 are juxtaposed and connected to each other by means of the connection means 7.

In this embodiment, the connection means 7 comprise at least one flexible foil coating element 11 applied to the secondary face 6*b* and to the corresponding main face 2*b*.

In more detail, the coating element 11 is about 0.1 mm thick.

The coating element 11 holds the portions 2 and 6 joined together and at the same time allows the rotation of the retaining portion 6 around the at least one longitudinal axis A.

Similar to what has been said above for the connecting strap 10, the coating element 11 can also be folded at several points, therefore, it does not define a single longitudinal axis A but, rather, a plurality of longitudinal axes A around which rotation can take place, thus giving multiple degrees of freedom to the retaining portion 6.

In addition, the coating element 11 also has an aesthetic function, in fact, it can be made in various colors and finishes in order to give the profiled element a particular aesthetic effect.

The present invention also relates to a second embodiment of the process for the manufacture of a door/window made of plastic material provided with three or more profiled elements 1 according to the third embodiment.

The second embodiment of the process is similar to the first embodiment shown in FIGS. 7 to 11, to the detailed description of which reference should be made. It is easy to understand, however, that to obtain the profiled element 1 shown in FIGS. 12 and 13, the extrusion mask is shaped so as to obtain the main portion 2 and the retaining portion 6 in separate body pieces, which are then assembled by means of the application of the coating element 11.

The process in fact comprises the phase of applying the coating element 11 to the secondary face 6*b* and to the corresponding main face 2*b*.

In addition, the coating element 11 can also be applied to the other main face 2*b* of the main portion 2.

In addition, further embodiments cannot be ruled out wherein the connection means 7 comprise both the connecting strap 10 and the coating element 11.

In this case, the coating element 11 will mainly have an aesthetic function.

In a fourth embodiment of the profiled element 1 according to the invention, which is not shown in the figures, locking means 8 are provided other than those shown above.

Instead of the notches 9*a*, 9*b*, the locking means 8 comprise at least a first locking area defined on the main portion 2 and at least a second locking area defined on the retaining portion 6 and intended to come into contact by interposition of bonding means.

In other words, the retaining portion 6 and the main portion 2 are maintained in the retaining configuration thanks to the adhesive action given by the bonding means.

In this case, the bonding means may be of the resin, glue or similar type.

Clearly in this case the process for the manufacture of the door/window 4 comprises, prior to the movement of the retaining portions 6 towards the retaining configuration, the phase of applying the above mentioned bonding means on the first locking area and on the second locking area.

It has, in practice, been ascertained that the described invention achieves the intended objects and in particular it is underlined that the profiled element for windows and doors made of plastic material, in particular PVC, according to the present invention, allows considerably simplifying the glazing operation.

In addition, the present profiled element makes it possible to significantly reduce the costs associated with this operation.

Finally, the profiled element for windows and doors made of plastic material, in particular PVC, makes it possible to create a window and door provided with appreciable aesthetic effects, in a practical, easy and functional manner.

In fact, the presence of the connection means ensures that no cracks are created between the main portion and the retaining portion, as is the case with windows and doors of a known type, and this makes it possible to eliminate the deposit of dirt in these cracks, further contributing to improving the aesthetic appearance of these windows and doors.

The invention claimed is:

1. A profiled element (1) for doors/windows made of plastic material, in particular PVC, wherein said profiled element (1) comprises:
   at least one main portion (2) made of plastic material extending along a longitudinal direction and defining a holding surface (2a) for a central panel (3) of a door/window (4), said main portion (2) being adapted to form a perimeter frame (5) of said door/window (4);
   at least one retaining portion (6) which extends parallel to said longitudinal direction, defines an abutment surface (6a) of said central panel (3) and is adapted to fasten said central panel (3) to said perimeter frame (5); and
   non-removable connection means (7) which connect said main portion (2) to said retaining portion (6), extend along at least one longitudinal axis (A) parallel to said longitudinal direction and are adapted to allow a movement of said retaining portion (6) with respect to said main portion (2) between a raised configuration, wherein said retaining portion (6) frees superiorly said holding surface (2a) for the positioning of said central panel (3), and a retaining configuration, wherein said retaining portion (6) faces said holding surface (2a);
   wherein said main portion (2) is provided with at least one main face (2b) and said retaining portion (6) is provided with at least one secondary face (6b), wherein, in said raised configuration, said faces (2b, 6b) are close to each other;
   wherein said connection means (7) comprises at least one of:
   (1) a connecting strap (10) foldable between said retaining configuration and said raised configuration, wherein said connecting strap (10) is foldable at several points and defines a plurality of longitudinal axes (A) around each of which said retaining portion (6) may rotate to position itself between said retaining configuration and said raised configuration and gives multiple degrees of freedom to said retaining portion (6), and
   (2) at least one flexible foil coating element (11) applied to said secondary face (6b) and said main face (2b), wherein said coating element (11) is foldable at several points and defines a plurality of longitudinal axes (A) and gives multiple degrees of freedom to said retaining portion (6).

2. The profiled element (1) according to claim 1, wherein said main portion (2), said retaining portion (6) and said connection means (7) are made of a single body piece of plastic material.

3. The profiled element (1) according to claim 1, wherein said main portion (2) and said retaining portion (6) are made in separate body pieces and are kept together by said connection means (7).

4. The profiled element (1) according to claim 1, wherein said connection means (7) comprise at least one flexible foil coating element (11) applied to said secondary face (6b) and said main face (2b).

5. The profiled element (1) according to claim 1, wherein said profiled element (1) comprises locking means (8) of said retaining portion (6) in said retaining configuration which are positionable between a disengagement position, wherein said locking means (8) allow the movement of said retaining portion (6) between said retaining configuration and said raised configuration, and at least one engagement position, wherein said locking means (8) operate in conjunction with said central panel (3) to maintain said retaining portion (6) in said retaining configuration.

6. The profiled element (1) according to claim 5, wherein said locking means (8) comprise at least a first notch (9a) defined on said main portion (2) and at least a second notch (9b) defined on said retaining portion (6) adapted to define a ratchet coupling.

7. The profiled element (1) according to claim 5, wherein said locking means (8) comprise at least a first locking area defined on said main portion (2) and at least a second locking area defined on said retaining portion (6) and intended to come into contact by interposition of bonding means.

8. The profiled element (1) according to claim 1, wherein said profiled element (1) comprises at least a first seal element (12) associated with said main portion (2) at said holding surface (2a).

9. The profiled element (1) according to claim 8, wherein said profiled element (1) comprises at least a second seal element (13) associated with said retaining portion (6) at said abutment surface (6a).

10. The profiled element (1) according to claim 1, wherein said profiled element (1) comprises at least one end (14) substantially inclined by an angle between 10° and 80° with respect to said longitudinal direction, wherein said main portion (2) comprises at least one area to be welded (15) defined at said end (14) and adapted to be welded to at least one area to be welded (15) of another adjacent profiled element (1) to form a perimeter frame (5).

11. The profiled element (1) according to claim 10, wherein said main portion (2) is provided with at least one main face (2b) and said retaining portion (6) is provided with at least one secondary face (6b), said profiled element (1) comprising at least a first recess (16) defined at said secondary face (6b) to form a first surface (16a) substantially parallel to said area to be welded (15) and placed at a first distance (D1) from said area to be welded (15).

12. The profiled element (1) according to claim 11, wherein said profiled element (1) comprises a second recess (17) defined at an internal matrix of said retaining portion (6) to form a second surface (17a) substantially parallel to said area to be welded (15) and placed at a second distance (D2) from said area to be welded (15), wherein said second distance (D2) is greater than said first distance (D1), and adapted to allow the movement of said retaining portion (6) between said raised configuration and said retaining configuration with respect to the retaining portion (6) of said adjacent profiled element (1).

* * * * *